United States Patent
Shimura et al.

(10) Patent No.: US 7,821,967 B2
(45) Date of Patent: Oct. 26, 2010

(54) APPARATUS AND A SYSTEM FOR REMOTE CONTROL AND A METHOD THEREOF

(75) Inventors: Mikiko Shimura, Tokyo (JP); Yasuhiro Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 479 days.

(21) Appl. No.: 11/905,068

(22) Filed: Sep. 27, 2007

(65) Prior Publication Data

US 2008/0080500 A1  Apr. 3, 2008

(30) Foreign Application Priority Data

Sep. 28, 2006  (JP) .............................. 2006-263732

(51) Int. Cl.
*H04L 12/28* (2006.01)
*H04L 12/56* (2006.01)

(52) U.S. Cl. .................. 370/254; 370/389; 370/401

(58) Field of Classification Search ............. 370/252, 370/254, 255, 389, 392, 400, 401
See application file for complete search history.

(56) References Cited

U.S. PATENT DOCUMENTS 7,082,129 B2 * 7/2006 Cromer et al. ............ 370/389
7,447,927 B2 * 11/2008 Siegmund ................ 713/310
2003/0065711 A1 * 4/2003 Acharya et al. .......... 709/203
2005/0058143 A1 * 3/2005 Kikuchi et al. ........... 370/401

FOREIGN PATENT DOCUMENTS

JP  2005-109763  4/2005

OTHER PUBLICATIONS

"Magic Packet Technology White Paper (published by Advanced Micro Devices, Inc. on Nov. 1995)".

* cited by examiner

*Primary Examiner*—Hong Cho
(74) *Attorney, Agent, or Firm*—McGinn IP Law Group, PLLC

(57) ABSTRACT

Disclosed is a remote control system which includes a remote control apparatus on a network, a control packet transmitter which is on a sub network and connects with the remote control apparatus via a network interconnecting apparatus, an operation terminal which can connect with the remote control apparatus, and a control target on the sub network of the control packet transmitter. The operation terminal transmits information which includes a control content of the control target to the remote control apparatus. The remote control apparatus includes a table including an address of the control packet transmitter and an address of the control target. The remote control apparatus transmits a control request packet including the acquired address of the control target and control content to the control packet transmitter. The control packet transmitter transmits a control packet including a control content designated by a control request packet to the control target.

29 Claims, 13 Drawing Sheets

| NAME OF TARGETS | TARGET MAC ADDRESS | ROUTER IP ADDRESS | USER NAME |
|---|---|---|---|
| SV1 | 12:34:56:78:9A:BC | 192.168.0.2 | X |
| SV2 | 12:34:56:78:DE:FF | 192.168.1.5 | Y |
| SV3 | 12:34:56⋯⋯ | 192.168⋯⋯ | Z |
| ⋯⋯ | ⋯⋯ | ⋯⋯ | ⋯⋯ |

Fig.5

APPARATUS AND A SYSTEM FOR REMOTE CONTROL AND A METHOD THEREOF

INCORPORATION BY REFERENCE

The application is based on Japanese Patent Application No. JP 2006-263732 filed on Sep. 28, 2006, and including a specification, claims, drawings and summary. The disclosure of the above Japanese Patent Application is incorporated herein by reference in its entirety.

BACKGROUND OF THE INVENTION

1. Technical Field

The present invention relates to a technology for remotely controlling a control target connected with a network.

2. Background Art

A Wake on LAN (hereinafter described as "WOL") technology is known as a technology by which a user remotely turns on a power supply of a network device such as a personal computer (PC) and a server. In the technology, a wake up packet is transmitted to a device to which no power is supplied and the device which receives the wake up packet is activated.

Magic Packet technology is known as one of related arts which specifically realize a WOL technology. In the technology, a packet called a Magic Packet is used as a wake up packet. A user transmits an instruction packet including a predetermined command to a remote control apparatus. Upon receipt of the instruction packet, the remote control apparatus transmits a Magic Packet to a device which a user intends to turn on with remote controlling (hereinafter described as power-on target device). A network interface of the power-on target device turns on a power supply thereof, upon receipt of the Magic Packet addressed to the device. For example, Magic Packet technology is described in "Magic Packet Technology White Paper (published by Advanced Micro Devices, Inc. on November 1995)" (hereinafter described as "reference 1").

FIG. 1A shows an exemplary configuration of a wake up packet. FIG. 1B shows information included in each part of a wake up packet. As shown in FIG. 1A and FIG. 1B, in an Ethernet MAC(Media Access Control) frame of a wake up packet, a MAC address of a power-on target device is repeatedly written 16 times in a data area (DATA) (MAC (1) to MAC (16)). In FIGS. 1A and 1B, DA represents a MAC address of a destination device. SA represents a MAC address of a source device. According to a specification of the Ethernet, when the DA is set to FF:FF:FF:FF:FF:FF(all "1"), the MAC frame is treated as a broadcast flame. Further, the reference 1 discloses the configuration shown in FIG. 1A and FIG. 1B.

FIG. 2 shows a related art of a remote control system using a WOL technology. FIG. 2 shows an example of a remote power-on system in which a portable computer 10 located out of a sub network 101 activates servers 121 and 122 or the like in the sub network 101.

In FIG. 2, the portable computer 10 is connected with a remote control apparatus 191 via a router 52, a backbone network 1, a router 100 and a router 181.

The sub network 101 is a sub network connected to the backbone network 1 via the router 100. The sub network 101 accommodates the router 181, the servers 121 and 122 and the remote control apparatus 191. The servers 121 and 122 include a network interface for receiving a wake up packet, respectively.

In the specification, a sub network represents an individual network having an individual network address in a group of networks that are connected with each other via a router. The sub network also includes a network divided by a subnet mask.

Similarly, a sub network 201 is a sub network connected to the backbone network 1 by a router 200. The sub network 201 accommodates a router 281, servers 221 and 222 and a remote control apparatus 291. The servers 221 and 222 include a network interface for receiving a wake up packet.

An operation of each part in a system when the portable computer 10 activates the server 121 is described using FIG. 2.

A user transmits an instruction packet from the portable computer 10 to the remote control apparatus 191 for instructing the remote control apparatus 191 to transmit a wake up packet to the server 121 (i.e. power-on target device). The instruction packet includes a command (e.g. power-on) to the remote control apparatus 191 and an IP(Internet Protocol) address thereof. The instruction packet reaches the remote control apparatus 191 via the router 52, the backbone network 1, the router 100 and the router 181. The remote control apparatus 191 holds information of a MAC address of the servers 121 and 122. When the remote control apparatus 191 receives the instruction packet from the portable computer 10, the remote control apparatus 191 generates a wake up packet in which a MAC address of the server 121 is written in MAC (1) to MAC (16) in a table shown in FIG. 1B. The remote control apparatus 191 broadcasts the wake up packets in the sub network 101.

Here, by broadcasting a wake up packet, the wake up packet reaches not only the server 121 but also the server 122. However, a MAC address of the server 122 is not written in MAC (1) to MAC (16) of the wake up packet. Accordingly, since the server 122 judges that the wake up packet is not addressed to the server 122, the server 122 does not operate any more even if the server 122 receives the wake up packet. The only server 121 performs a power-on operation after receiving the wake up packet including MAC address thereto.

As another related art, Japanese Patent Application Laid-Open No. 2005-109763 (hereinafter described as "reference 2") discloses a configuration in which a node located out of a network activates a computer in the network using a WOL technology.

The related art described in the background art causes following problems.

1. A wake up packet is a broadcast packet transmitted from a remote control apparatus which generates a wake up packet to a power-on target device. However, since a broadcast packet can not pass through a router and a firewall, a router or a firewall can not be installed between a remote control apparatus and a power-on target device. That is, a remote control apparatus needs to be installed in each network unit which is divided by a router or a firewall.

2. With the increase in size of a corporate network, sub networks which exist in a corporate network are increasing in number. For this reason, power-on target devices which use a wake up packet are separately installed in many sub networks. Accordingly, the number of required remote control apparatuses is increasing along with the increase of sub networks. As a result, in a remote control system mentioned above, an introduction cost of a remote control apparatus increases along with the increase of sub networks.

3. In a remote power-on system using a wake up packet, a remote control apparatus exists for each sub network. Thus, an operator needs to store information about a power-on target device managed by each remote control apparatus into each remote control apparatus. When a power-on target device is moved to another network, an operator has to register again information thereof to each remote control apparatus. Further, it is necessary for a user to acquire, from the operator, the latest information of a remote control apparatus on a sub network on which a power-on target device is installed and to store the information into a portable computer. A user needs to always keep a content of a portable computer correct so that a user can correctly designates a remote control apparatus which manages a power-on target device by using a correct destination address for an instruction packet. As a result, in the remote power-on system above-mentioned, a maintenance/operation cost of a remote control apparatus, after introducing becomes high.

4. Also, a wake up packet cannot pass through a router and a firewall. For this reason, in a remote power-on system of related arts, a remote control apparatus and a power-on target device have to be installed in the same network. Also, in the remote power-on system of related arts, a device in a firewall cannot be activated by a remote control apparatus located out of the firewall even if a remote control apparatus is installed outside of a firewall of a company network.

5. Accordingly, even if an administrator of a network wants to provide a convenient system for users, but it is difficult to introduce a remote power-on system using a WOL technology in view of difficulties in operations and management.

6. In the reference 2 mentioned in the background art, a WOL apparatus is located on a sub network to which a device of power-on target belongs. Accordingly, it is necessary for a user to designate a WOL apparatus installed for each sub network and to transmit an activation instruction packet. The reference 2 does not handle the above-mentioned difficulties.

SUMMARY

An exemplary object of the present invention is to provide, a remote control system in which remote control apparatuses can be installed together in one place such as a center in a company and an installation and operation cost of a remote control apparatus can be reduced.

In a first exemplary embodiment, there is provided a remote control system which comprises a remote control apparatus on a network, a control packet transmitter which is on a sub network and is connected with the remote control apparatus via a network interconnecting apparatus, an operation terminal which can be connected with the remote control apparatus and a control target installed on the sub network on which the control packet transmitter is installed.

The advantage of a remote control system of the present invention is to reduce an introduction cost of a device.

In a network in a company, it is preferable that remote control apparatuses are installed together in only one place on an intra-company network.

Other exemplary features and advantages of the present invention will be apparent from the following description taken in conjunction with the accompanying drawings, in which like reference characters designate the same or similar parts throughout the figures thereof.

BRIEF DESCRIPTION OF THE DRAWINGS

Exemplary features and advantages of the present invention will become apparent from the following detailed description when taken with the accompanying drawings in which:

FIG. 5 is a figure showing a device information table of a first exemplary embodiment of the present invention;

EXEMPLARY EMBODIMENTS

Exemplary embodiments of the present invention will now be described in detail in accordance with the accompanying drawings.

Figure 3:
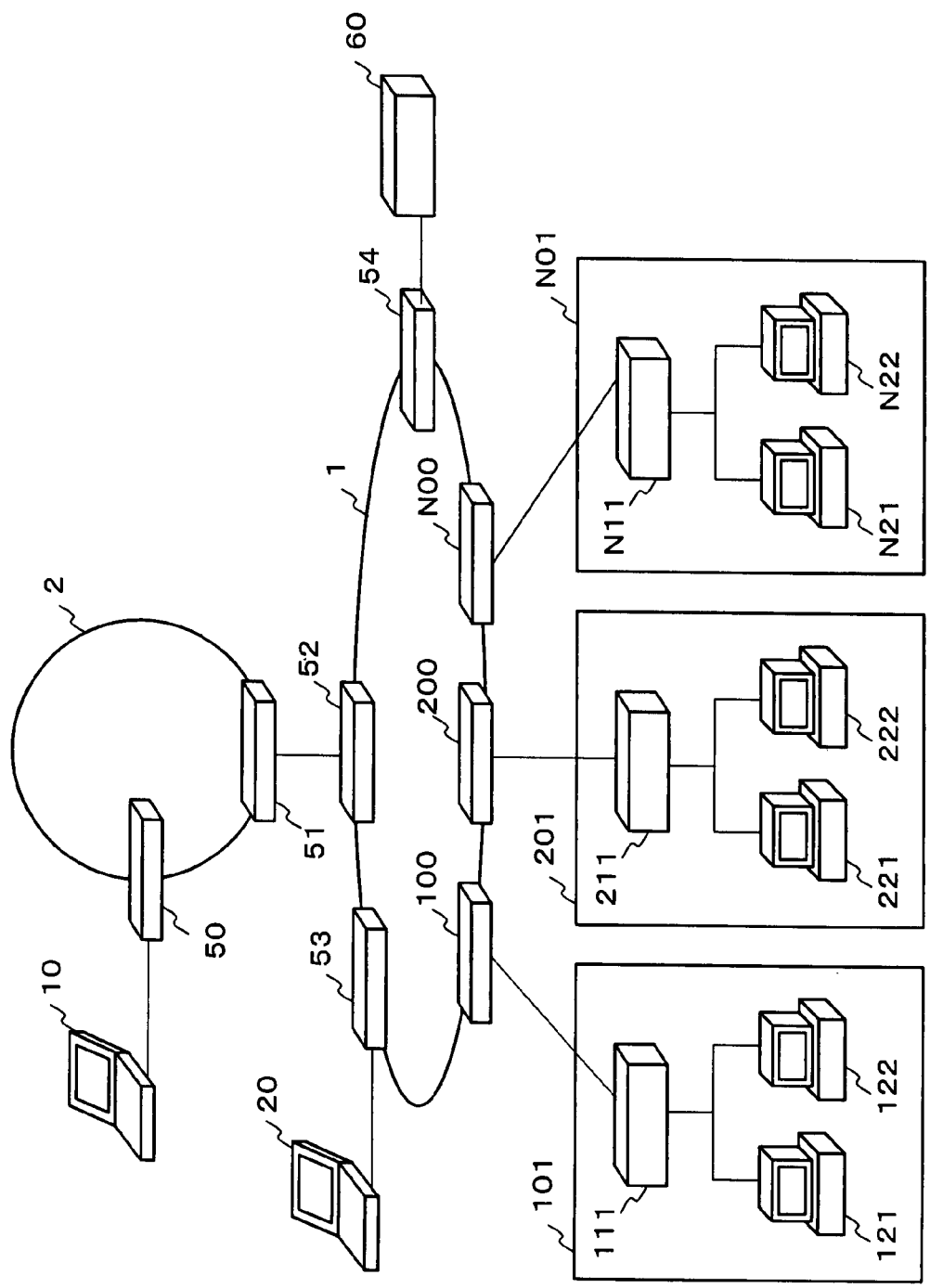
FIG. 3 is a figure showing a first exemplary embodiment of the present invention.

FIG. 3 shows a first exemplary embodiment of a remote control system of the present invention. FIG. 3 shows an example of a remote control system in which a power supply of a control target (i.e. server) is remotely turned on by a terminal (i.e. portable computer) that is placed far from the control target.

The remote control system includes a backbone network 1 and sub networks 2, 101 to N01 as shown in FIG. 3.

The sub network 2 connects with the backbone network 1 via routers 51 and 52. The sub network 101 connects with the backbone network 1 via routers 100 and 111. The sub network 101 accommodates the router 111 and servers 121, 122. The sub network 201 connects with the backbone network 1 via routers 200 and 211. The sub network 201 accommodates the router 211 and servers 221, 222.

Similarly, a N-th sub network N01 which accommodates servers connects with the backbone network 1 via routers N00 and N11. The sub network N01 accommodates the router N11 and the servers N21 and N22.

In the exemplary embodiment, a remote control apparatus 60 connects with the backbone network 1 via a router 54. A router is an aspect of a network interconnecting apparatus.

The portable computer 10 connects with the backbone network 1 via a router 50, the sub network 2, the router 51 and the router 52. A portable computer 20 connects with the backbone network 1 via a router 53.

When a user inputs a control instruction for either one of the servers 121, 122 to N21 or N22 to the portable computer 10, the portable computers 10 transmits, to a remote control apparatus 60, a control instruction packet including the control instruction and information for specifying a server to be controlled. Another user may input the control instruction to the portable computer 20 to conduct the same operation above-mentioned.

The backbone network 1 is, for example, a relatively large network which is installed at a headquarters of a company. The routers 52 to 54 and 100 to N00 are located on the backbone network 1. Servers in the sub networks 101 to N01 are connected with the backbone network 1 via the routers 111 to N11 and the routers 100 to N00.

The sub network 2 is a network which exists far from a headquarters of a company. The sub network 2 is connected with the backbone network 1 via the routers 51 and 52.

Further, a sub network represents a network which includes an individual network address in a group of networks that are connected with each other via routers. The sub network also represents a network divided by a subnet mask.

The sub network 101 is one of the sub networks connected with the backbone network 1. The servers 121 and 122 in the sub network 101 are connected with the router 100 via the router 111.

The sub networks 101 to N01 include an individual network address, respectively. A configuration of the sub networks 201 to N01 is the same as that of the sub network 101.

The servers 121, 122 to N21 and N22 are devices which a user desires to control (i.e. control targets).

When a plurality of terminals such as the portable computers 10 and 20 for instructing the remote control apparatus 60 to perform a remote control are arranged, remote control to a desired control target can be performed from different positions on the backbone network 1 or the sub network. Furthermore, even when one portable computer is used at differing time points at different locations on a sub network or the backbone network 1, the same operation can be performed by the portable computer. Further, the similar operation can be also performed by using a desktop personal computer or a workstation instead of the portable computers 10 and 20.

Upon receipt of a control instruction packet from the portable computer 10 or the portable computer 20, the remote control apparatus 60 searches for information about a control target using a device information table which is stored therein. The remote control apparatus 60 transmits a control request packet to a router on a sub network which includes a control target.

Figure 4:
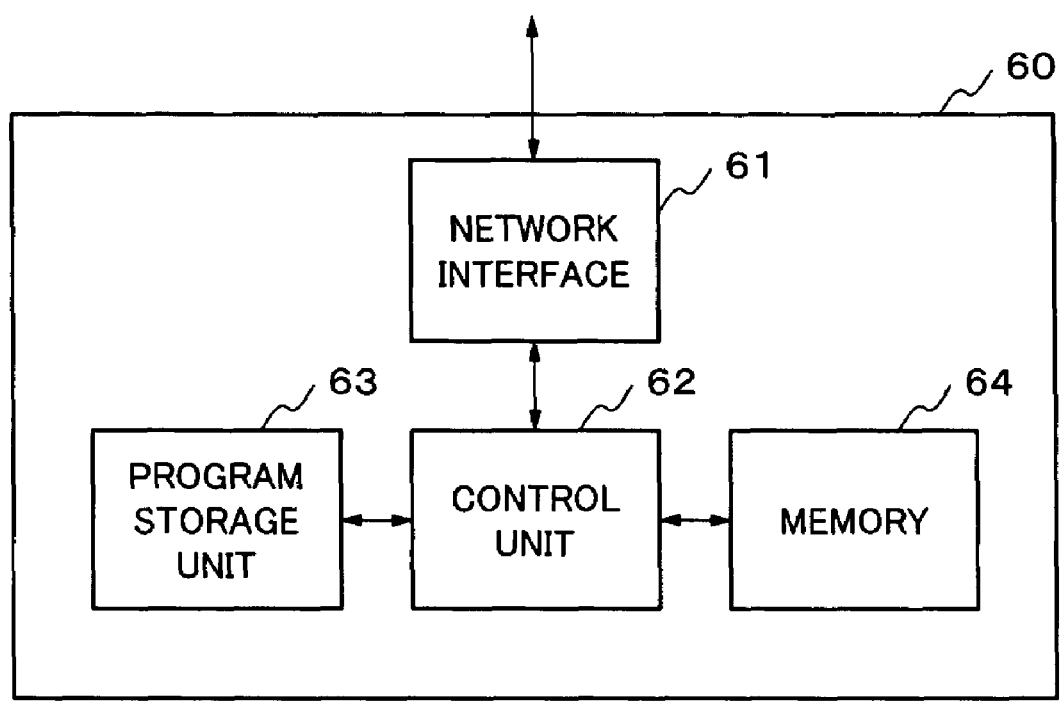
FIG. 4 is a figure showing an internal configuration of a remote control apparatus of a first exemplary embodiment of the present invention.

FIG. 4 shows an internal configuration of the remote control apparatus 60. In FIG. 4, the remote control apparatus 60 includes a network interface 61, a control unit 62, a program storage unit 63 and a memory 64.

The network interface 61 is a physical interface unit which transmits/receives a packet to/from an external device. The unit may be a network interface card (NIC) mounted on a server, or the like.

The control unit 62 controls the whole of the remote control apparatus 60 according to a program stored in the program storage unit 63. The control unit 62 interprets a control instruction packet from the portable computers 10 or 20 and generates a control request packet to the router 111 to which a control target connects. The control unit 62 performs HTTP tunneling to transmit the control request packet to the router 111. Further, the control unit 62 transmits a result of a control packet transmission request as a reply to a terminal (i.e. the portable computer 10 or the portable computer 20) which transmit a control instruction packet.

The memory 64 holds a device information table shown in FIG. 5. In FIG. 5, the device information table holds information about a name and a MAC address of a control target managed by the remote control apparatus 60, an IP address of a router which connects to a sub network accommodating a control target, and a user name of a control target.

In FIG. 3, the router 111 includes a routing function for an IP packet, and an additional function for receiving a control packet transmission request from the remote control apparatus 60 and a further additional function for generating a control packet and transmitting the control packet to a control target. Such additional functions can be realized by installing software having a function for a control packet to an ordinary router, as described below.

Figure 6:
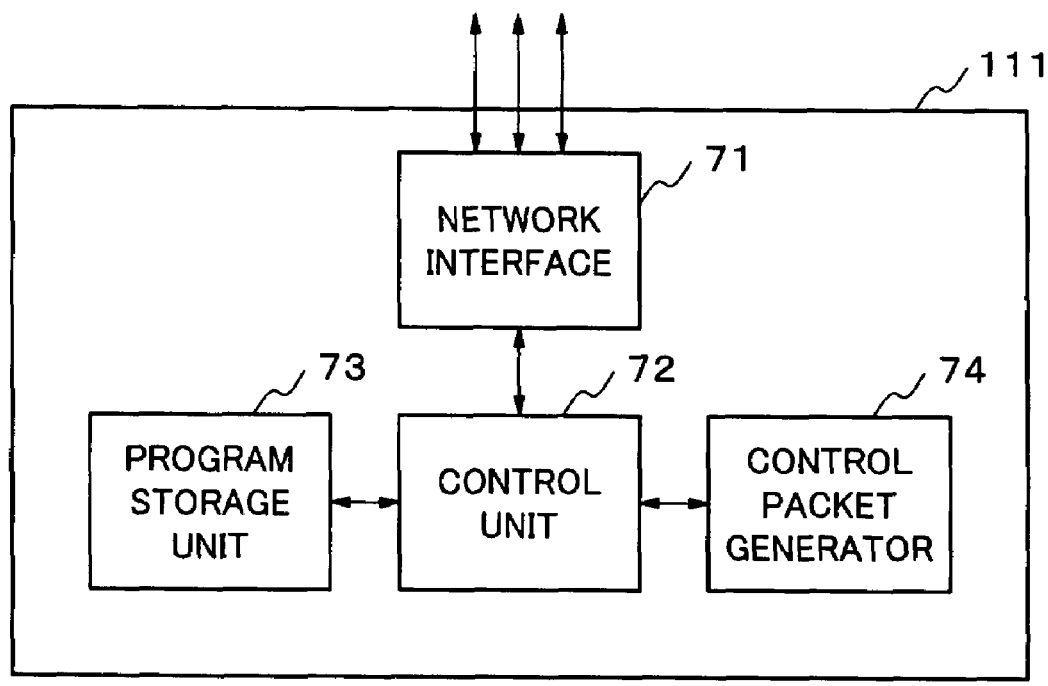
FIG. 6 is a figure showing an internal configuration of a router of a first exemplary embodiment of the present invention.

FIG. 6 shows a configuration of the router 111 as an example of a router. In FIG. 6, the router 111 includes a network interface 71, a control unit 72, a program storage unit 73 and a control packet generator 74.

The network interface 71 is a physical interface unit which transmits/receives a packet to/from a connected device. A router usually includes a plurality of physical interfaces.

The control unit 72 performs a routing operation of a received packet and controlling each part of a router according to a program stored in the program storage unit 73. The control unit 72 broadcasts control packets generated by the control packet generator 74 from the network interface 71 into a sub network on which a control target is installed.

When the control unit 72 receives a control request for a control target from the remote control apparatus 60, the control packet generator 74 generates a control packet according to an instruction of the control unit 72.

The control packet generator 74 generates a message (from a control target) that shows a result to a control packet transmission request based on a transmission result of the control packet. The control unit 72 transmits the message to the remote control apparatus 60 from the network interface 71.

Further, in FIG. 3 and FIG. 6, the router 111 includes a basic function as a router and the above-mentioned control packet transmitting function. However, a different device other than a router which can transmit broadcast packets into a sub network can work as the router. For example, a bridge, a hub or a switch which install software having a function for a control packet can include the same function as that of the exemplary embodiment.

In FIG. 3, the servers 121, 122 to N21 and N22 are control targets that are objects remotely controlled by a user. Each of network interfaces provided in the server 121, 122 to N21 and N22 include a function to interpret a control packet which is transmitted by the routers 111 to N11 on the sub networks 101 to N01 and to operate according to the interpretation. When each of network interfaces of servers 121, 122 to N21 and N22 receives a control packet, servers 121, 122 to N21 and N22 perform predetermined control.

Further, a control target is not always a server, and a device whose network interface includes a function for interpreting a control packet maybe a control target. For example, a control target may be a portable computer. FIG. 3 shows an example of a system configuration in which two servers exist on each sub network. Also, a server, a personal computer or the like can coexist on the sub network as a control target. There is no limitation on the number of control targets.

Next, an operation of a first exemplary embodiment of the present invention will be described in detail with reference to a configuration diagram shown in FIG. 3 and a flowchart shown in FIG. 7.

Hereinafter, a user X instructs a server 121 to turn on a power supply by using a wake up packet from a portable computer 10.

The user X may use a portable computer 20 for a power-on instruction. Even when an object of power-on is the server 122 other than the server 121, and an object of power-on is one of servers 221 to N22 which exist on different networks 201 to N11, the same operation is performed.

Figure 7:
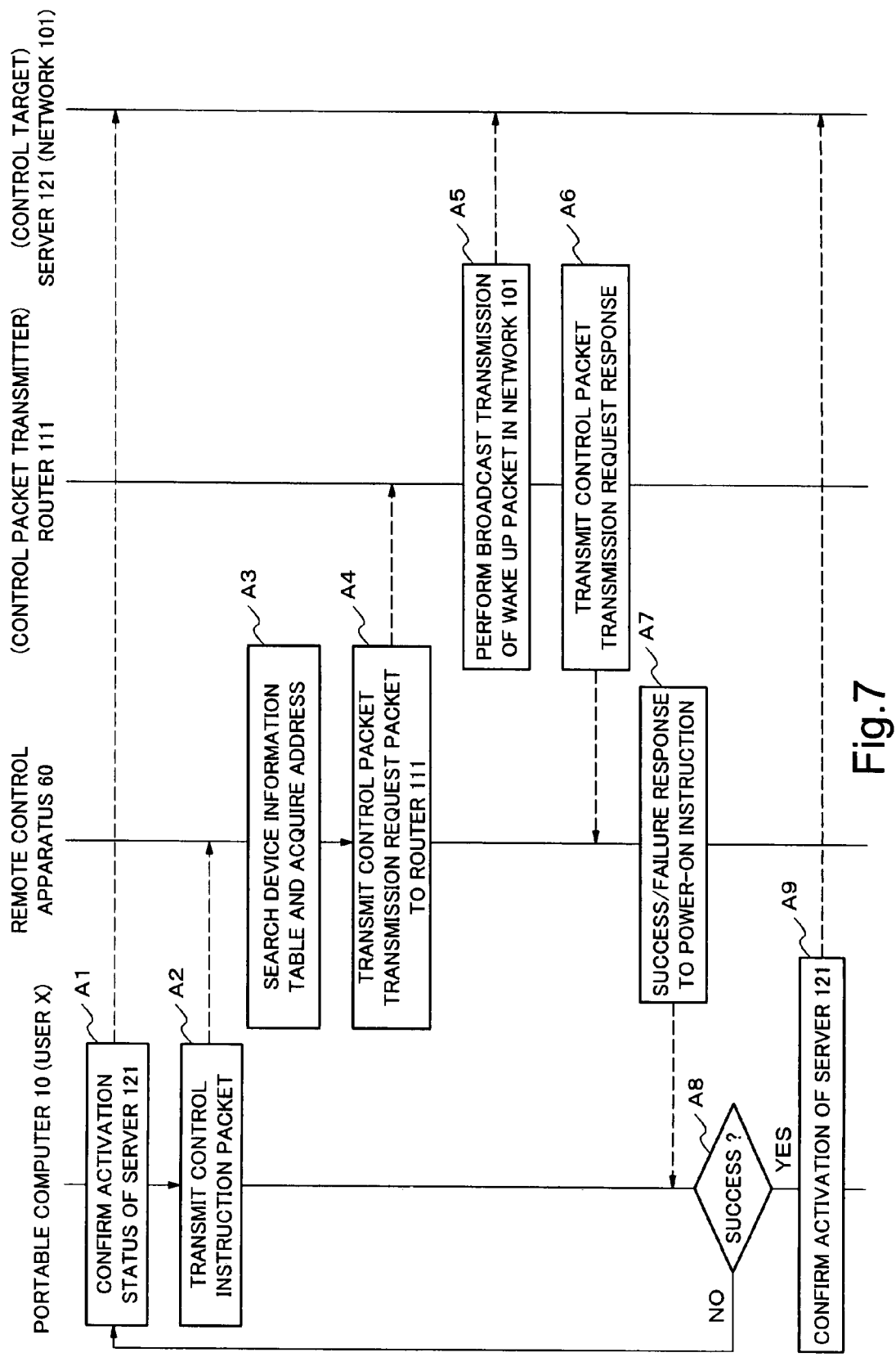
FIG. 7 is a flowchart showing an operation of a first exemplary embodiment of the present invention.

Referring to FIG. 7, first, the user X having authority of usage of the server 121 confirms an activation status of the server 121 through a portable computer 10 (step A1 in FIG. 7). Confirmation of an activation status is performed by executing a standard ping command according to an IP protocol through the portable computer 10. The user X transmits a ping command to the server 121 from the portable computer 10. The user X judges that a power supply of the server 121 is turned on when receiving a response from the server 121, and the power supply of the server 121 is turned off when receiving no response therefrom. When the user X judges that the power supply of the server 121 is turned off, the user X proceeds to a procedure of a power-on instruction described below.

The user X executes a power-on instruction (i.e. transmission of a control instruction packet) to the server 121 from the portable computer 10 (step A2). Then, the portable computer 10 transmits the control instruction packet for instructing to turn on the power supply of the server 121 to the remote control apparatus 60. For example, the user X uses a web browser installed in the portable computer 10 to transmit the control instruction packet from the portable computer 10 to the remote control apparatus 60. First, the user X displays a web page of the remote control apparatus 60 from the portable computer 10. The user X selects "server 121" and "power-on function" in items displayed on a screen. Performing the operation, the portable computer 10 transmits a control instruction packet which instructs the server 121 to turn on a power supply to the remote control apparatus 60.

Figure 8:
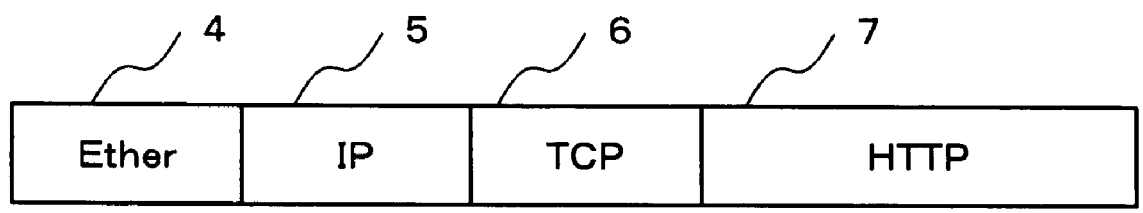
FIG. 8 is a figure showing a configuration of HTTP packet.

FIG. 8 shows an exemplary configuration of a control instruction packet. HTTP data is sent according to TCP/IP. An Ethernet frame includes an Ethernet header 4, an IP header 5, a TCP header 6 and HTTP data 7. A content of a control instruction packet is described in HTTP data.

It is only necessary that a control instruction packet includes information to uniquely identify the server 121 in order to designate, from the portable computer 10, the server 121 that is an object of power-on. The information is, for example, a name of the server 121, a management number, an IP address, a MAC address of a network interface of the server 121 and the like. In the exemplary embodiment, the remote control apparatus 60 includes a device information table shown in FIG. 5. Here, the user X instructs a power-on by designating "SV1" that is a name of the server 121 on the portable computer 10.

Upon receipt of the control instruction packet from the portable computer 10, the remote control apparatus 60 reads out the name "SV1" of a device that is an object of power-on from information of a received control instruction packet, searches a device information table shown in FIG. 5, and acquires a MAC address (12:34:56:78:9A:BC) of the device that is an object of power-on and an IP address (192.168.0.2) of a router on a network on which the device is installed (step A3). Next, since a user name of the device "SV1" described in the device information table is X, the remote control apparatus 60 confirms that a user X who transmits a control instruction packet has an authority to turn on the power supply of the device "SV1" (the server 121 in FIG. 3).

Next, the remote control apparatus 60 transmits a control request packet to the router 111 on a network which includes the server 121 (step A4). At the time, the remote control apparatus 60 can transmit a control request packet to the router 111 using HTTP tunneling.

A HTTP tunneling is a method in which a HTTP header is added to a transmitted packet, and the packet is transmitted as HTTP data. In HTTP tunneling, a control request packet can pass through port 80 that is a port for HTTP of a router or a firewall. The port 80 is called as "well-known port" and a HTTP packet can pass through the port 80 in an usual router or a firewall. That is, even if a router or a firewall exists between the remote control apparatus 60 and the router 111, the remote control apparatus 60 can deliver a control request packet to the router 111 using HTTP tunneling. A configuration of a packet in HTTP tunneling is the same as a configuration shown in FIG. 8. That is, a control request packet is embedded in HTTP data part shown in FIG. 8 to be transmitted.

Figures 1A, 1B:
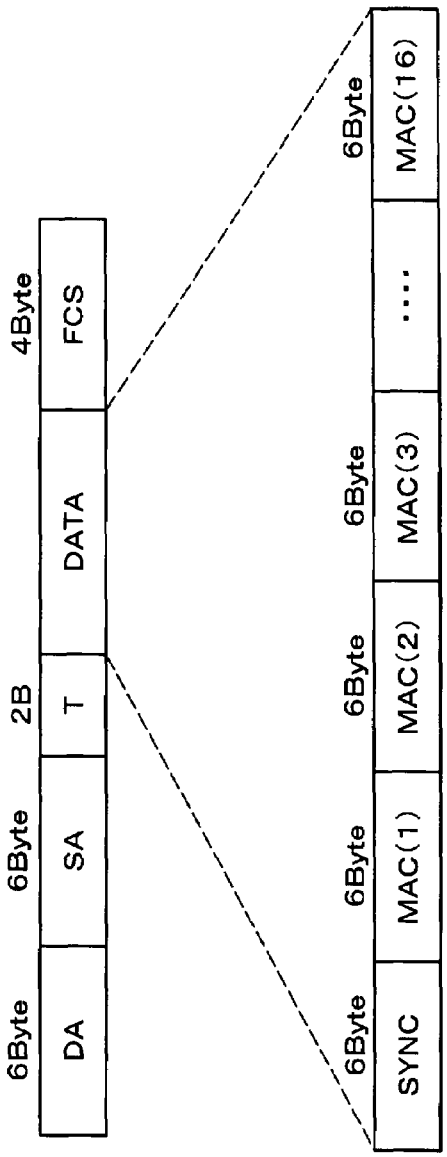
FIG. 1A is a figure showing a configuration of a wake up packet.
FIG. 1B shows information included in each part of a wake up packet.

The router 111 generates a wake up packet for activating the power supply of the server 121 from information included in a control request packet received from the remote control apparatus 60. The router 111 broadcasts wake up packets into the network 101 on which the server 121 exists (step A5). A configuration of the wake up packet is shown in FIG. 1A. A MAC address of the server 121 is described 16 times in a data part of the wake up packet. Upon receipt of the wake up packet, the server 121 confirms whether the MAC address thereof is described 16 times in a data area of the wake up packet. After the MAC address is confirmed, the server 121 turns on the power supply thereof.

After broadcasting the wake up packets, the router 111 transmits a control packet transmission request response to the remote control apparatus 60 (step A6). Information included in the control packet transmission request response is "success" when a transmission of a wake up packet to the router 111 is successfully performed and "failure" when the transmission is failed. Also, with respect to a protocol used for a transmission of a control packet transmission request response, if HTTP tunneling is used, the control packet transmission request response can be delivered to the remote control apparatus 60 through a router or a firewall.

The remote control apparatus 60 which receives a control packet transmission request response transmits "success" or "failure" on the transmission to the portable computer 10 as a control instruction response (step A7).

The user X confirms the control instruction response which the portable computer 10 receives from the remote control apparatus 60. When the response is "failure", the user X performs a control instruction again (step A8). When the response is "success", the user X confirms an activation status of the server 121 (step A9), and a series of operations for a power-on is completed.

Figure 2:
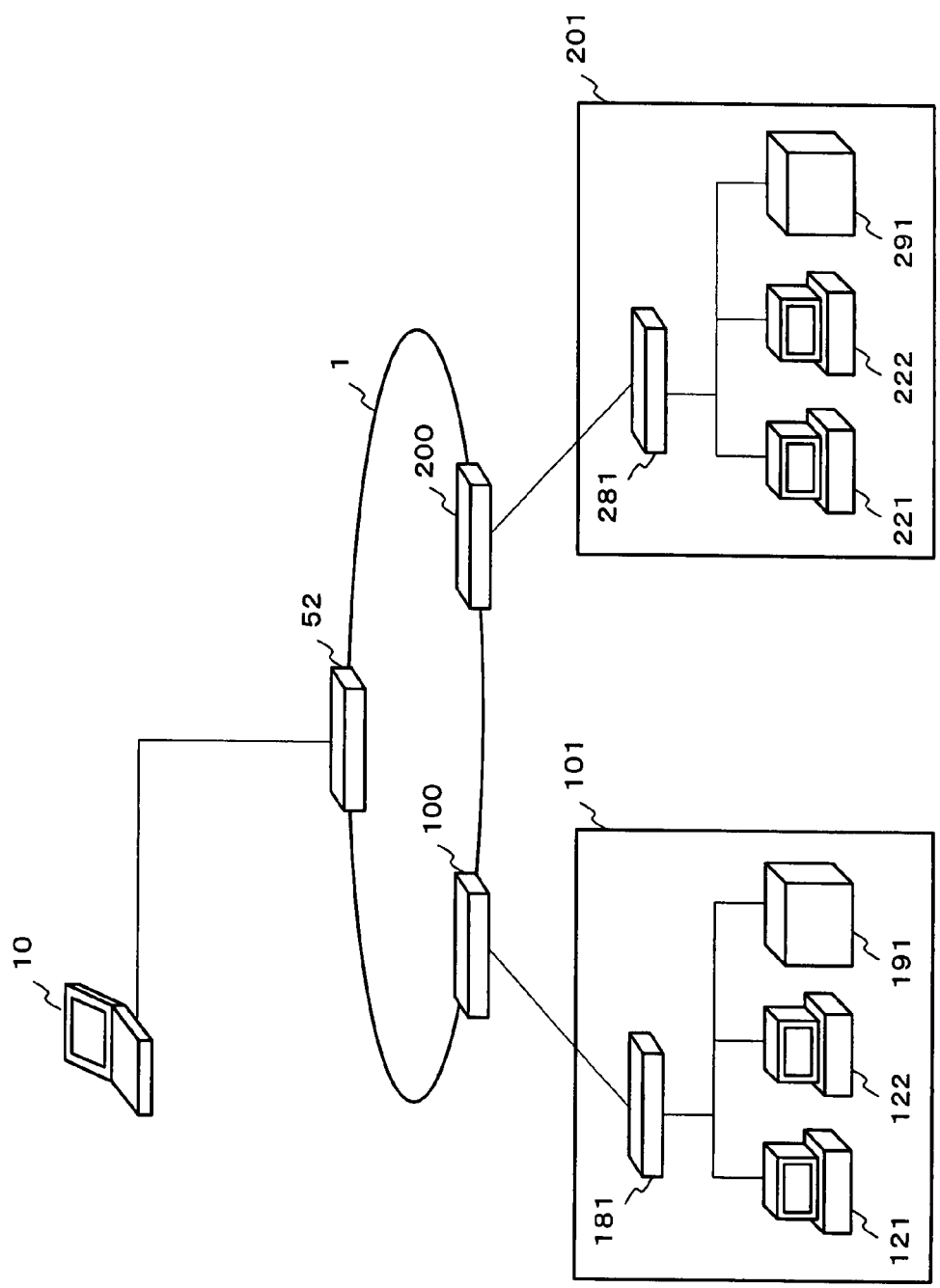
FIG. 2 is a figure showing a remote control system.

In a related art, the remote control apparatus 191 shown in FIG. 2 includes an information management function of a control target and a control packet transmission function. However, as described above, in a remote control system of the exemplary embodiment, an information management function of a control target and a control packet transmission function are shared in the remote control apparatus 60 and the router 111 respectively. That is, in the exemplary embodiment, the remote control apparatus 60 performs an information management of a control target and a control packet transmission request to the router 111 and accordingly, the router 111 generates and transmits a wake up packet according to an instruction from the remote control apparatus 60.

Additionally, in a remote control system of the exemplary embodiment, a packet transmitted between the remote control apparatus 60 and the router 111 is embedded in a payload part of a HTTP protocol.

As a result, even if other router or firewall exists between the remote control apparatus 60 and the router 111 or the server 121, the remote control apparatus 60 can instruct the server 121 to transmit a control packet. Thus, in the exemplary embodiment, one remote control apparatus can control a control target in a plurality of other networks. That is, in a remote control system of the exemplary embodiment, since only one remote control apparatus in the system can perform desired operations, an introduction cost and operation cost of a remote control apparatus can be largely reduced.

The remote control apparatus of the exemplary embodiment integrally manages sub networks on which all the controlled devices are installed. Therefore, a user can remotely control a device without identifying a sub network on which the controlled device is installed. For example, when a sub network on which the controlled device is installed is changed, a user can operate the controlled device without knowing the change.

Even when a sub network on which the controlled device is installed is changed, a system administrator only needs to revise a device information table of one remote control apparatus.

Figure 9:
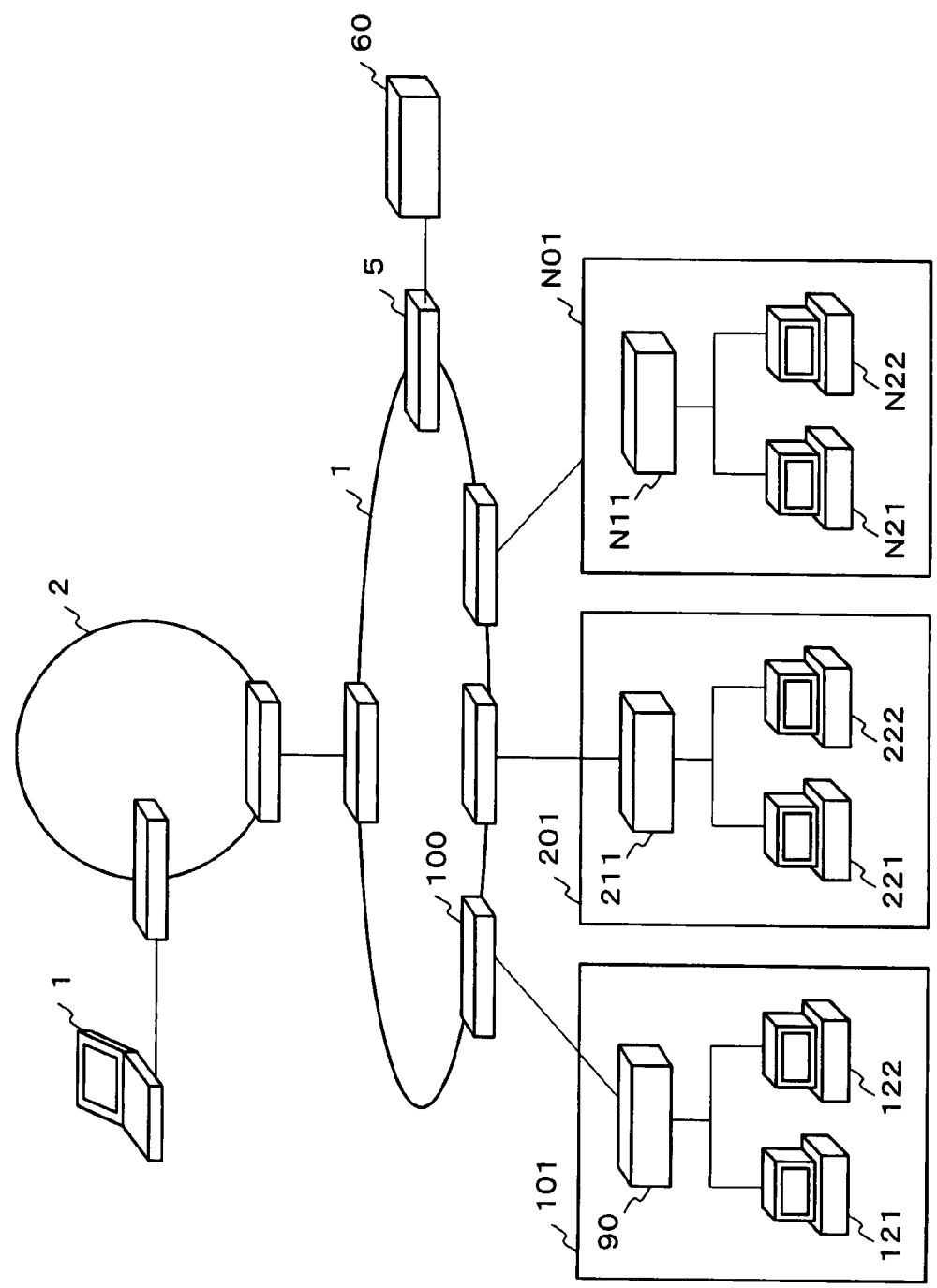
FIG. 9 is a figure showing a second exemplary embodiment of the present invention.

FIG. 9 shows a second exemplary embodiment of the-present invention. In a configuration of the embodiment, a hub 90 is a network device having a hub function. The hub 90 includes a function of a control packet transmission that is the same as that of the router 111 in the first exemplary embodiment.

In the configuration, an operation of instructing a power-on from the portable computer 10 to the remote control apparatus 60 is the same as that of the first exemplary embodiment. Also, an operation in which the server 121 receives a wake up packet and turns on a power supply is the same as that of the first exemplary embodiment.

An operation of the second exemplary embodiment will be described by FIG. 9. A user transmits a control instruction packet to the remote control apparatus 60 from the portable computer 10. A content of the control instruction packet is to turn-on a power supply of the server 121. The remote control apparatus 60 transmits a control packet transmission instruction packet to the sub network 101 via the router 5 and the router 100. The hub 90 includes a function for receiving the control packet transmission instruction packet that is transmitted from the remote control apparatus 60. Upon receipt of the control packet transmission instruction packet from the remote control apparatus 60, the hub 90 broadcasts wake up packets into the sub network 101. The server 121 which receives the wake up packet turns on a power supply.

Further, in the exemplary embodiment, a configuration of sub networks 201 to N01, and routers 211 to N11 and servers 221 to N22 that work under the sub networks is the same as that of the first exemplary embodiment.

Figure 10:
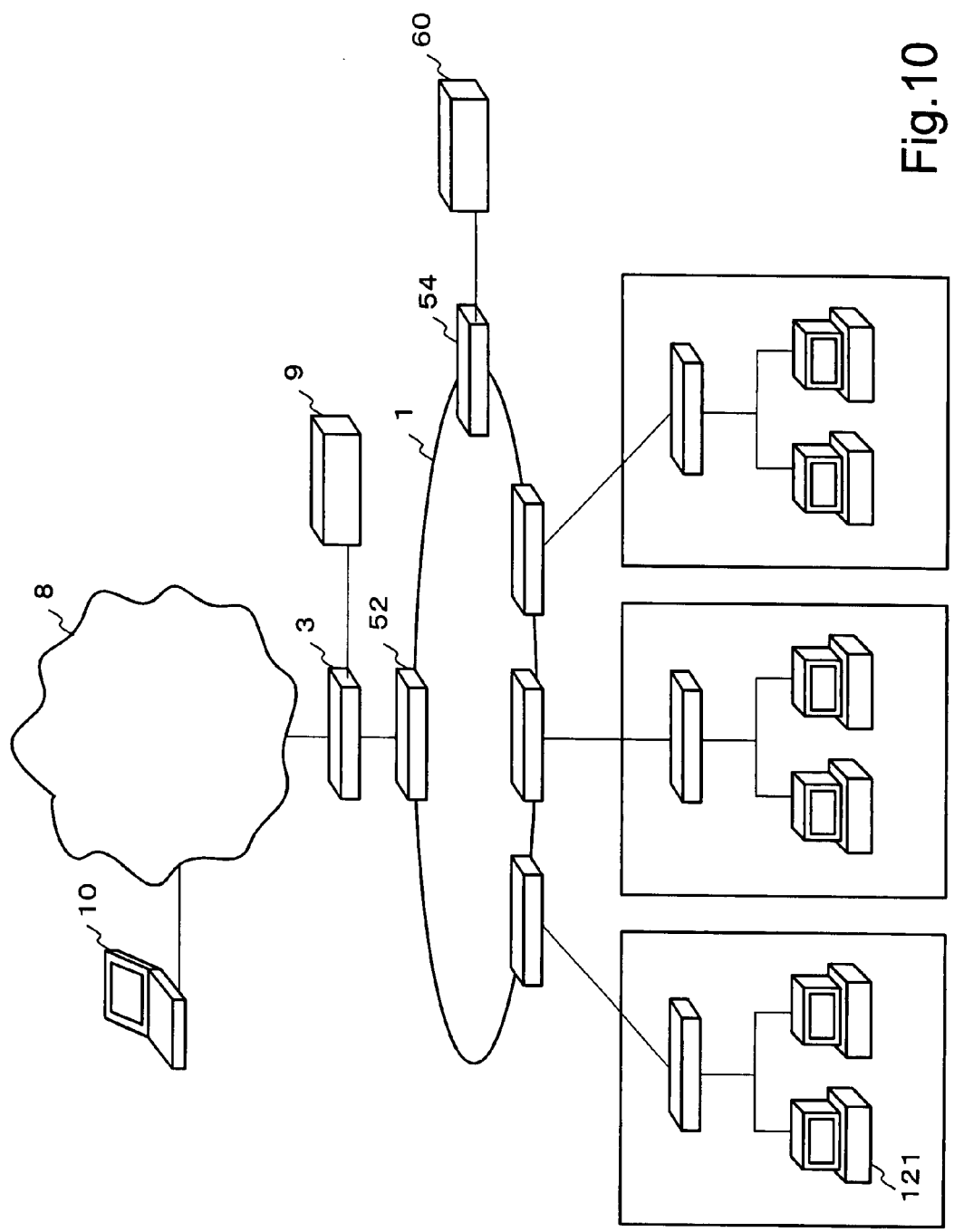
FIG. 10 is a figure showing a third exemplary embodiment of the present invention.

A third exemplary embodiment of the present invention will be described by FIG. 10. In FIG. 10, the portable computer 10 instructs the remote control apparatus 60 on the backbone network 1 to turn on a power supply via the Internet 8.

In FIG. 10, when a user intends to turn on a power supply of the server 121, the user needs to access the remote control apparatus 60 from outside of-a company. When the user accesses the backbone network 1 through the Internet, the user needs to obtain authentication from an authentication server 9. Thus, in advance of connection to the remote control apparatus 60, the user accesses the authentication server 9 via the firewall 3 using the portable computer 10.

The authentication server 9 authenticates an access from a network outside of the company such as the Internet to an internal network of the company and also provides a remote access service (RAS) in which a secure communication between an outside network and an internal network of a company is provided.

When authenticated by the authentication server 9, the user is allowed to connect the portable computer 10 with the backbone network 1. As a result, the portable computer 10 can access the remote control apparatus 60 via the Internet 8, the firewall 3, the router 52, the backbone network 1 and the router 54. An operation after that is the same as an operation after step A1 in FIG. 7 that is described in the first exemplary embodiment.

Figure 11:
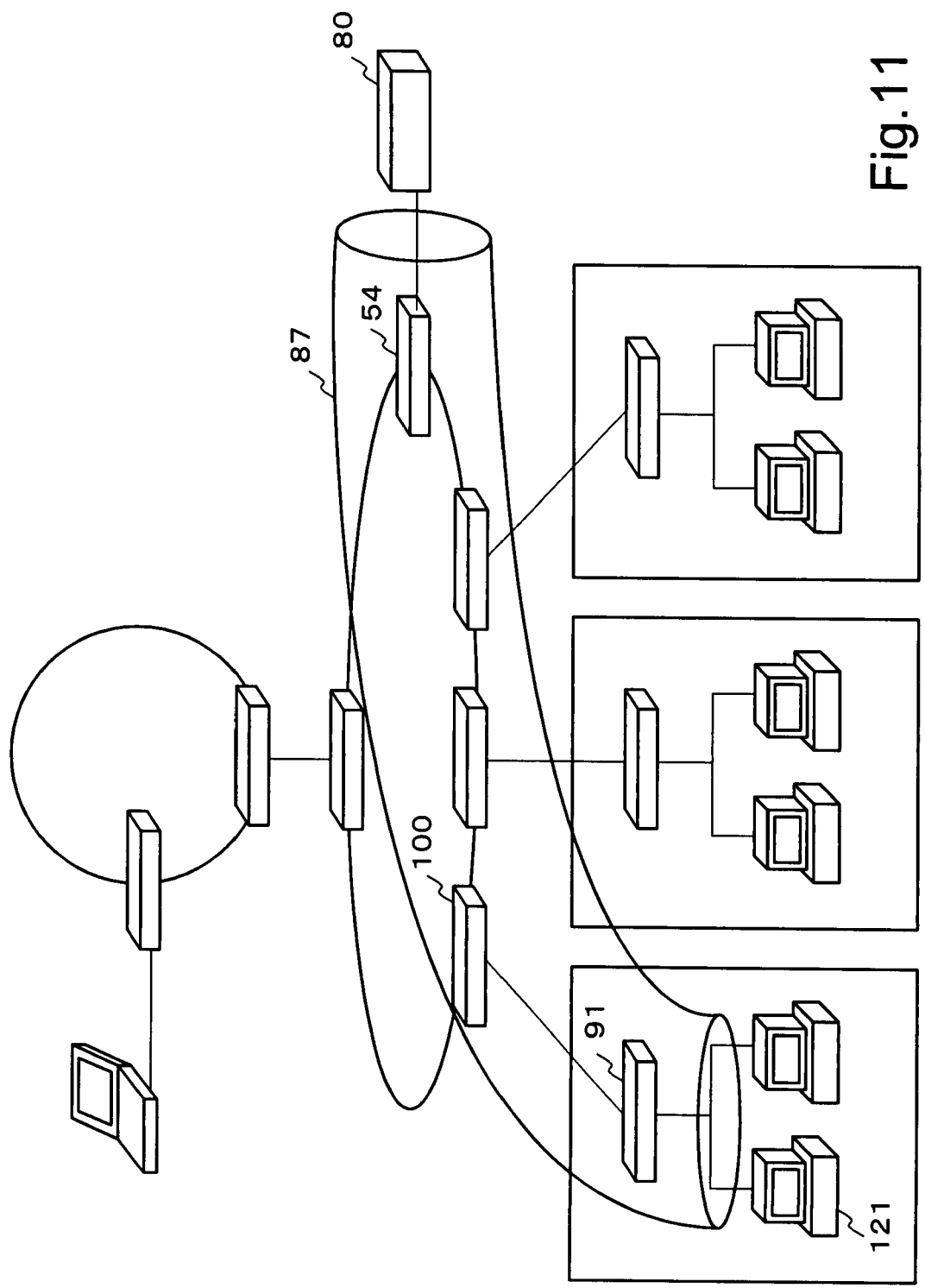
FIG. 11 is a figure showing a fourth exemplary embodiment of the present invention.

FIG. 11 shows a configuration of a remote control system of a fourth exemplary embodiment of the present invention. In the remote control system shown in FIG. 11, a server 121 is an object of power-on. A remote control apparatus 80 transmits a wake up packet to the server 121 through a router 54 and a router 100 by using an IP tunneling 87.

Figure 12:
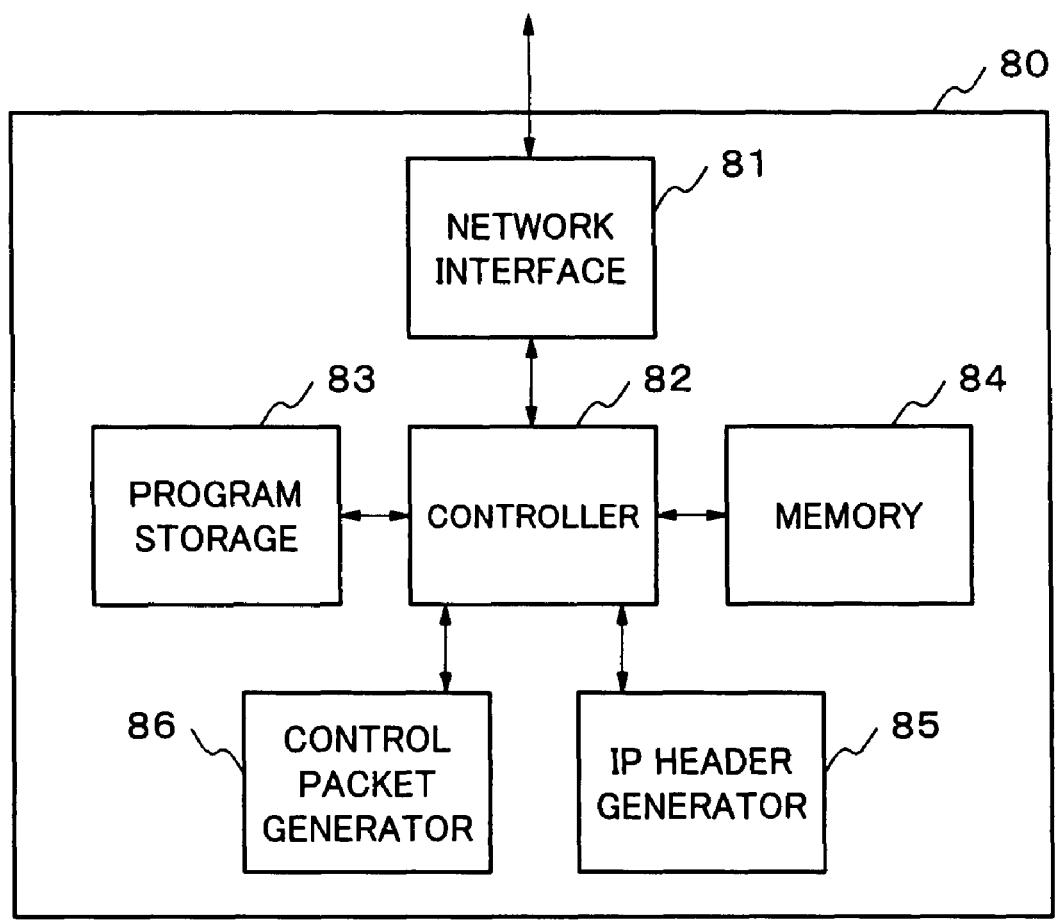
FIG. 12 is a block diagram showing a configuration of a remote control apparatus in a fourth exemplary embodiment.

FIG. 12 is a block diagram of the remote control apparatus 80 of the fourth exemplary embodiment. The remote control apparatus 80 includes a network interface 81, a control unit 82, a program storage unit 83, a memory 84, an IP header generator 85 and a control packet generator 86.

The network interface 81 transmits/receives a packet to/from the router 54. The control unit 82 controls the whole remote control apparatus 80 according to a program stored in the program storage unit 83. The control packet generator 86 generates a wake up packet according to an instruction of the control unit 82. The memory 83 holds a device information table shown in FIG. 5, which is the same as that of the first exemplary embodiment.

The control unit 82 reads out information in a control instruction packet which a user transmits from the portable computer 10. The control unit 82 searches a device information table shown in FIG. 5. The control unit 82 identifies an IP address of a router of a network on which the server 121 that is an object of power-on is installed, a MAC address of a server that is an object of power-on and the like based on the search result. For example, when a user Y designates "SV2" as a name of a device, information such as a MAC address (12:34:56:78:DE:FF) and a router address (192.168.1.5) is searched for in a device information table.

Figures 13A, 13B:
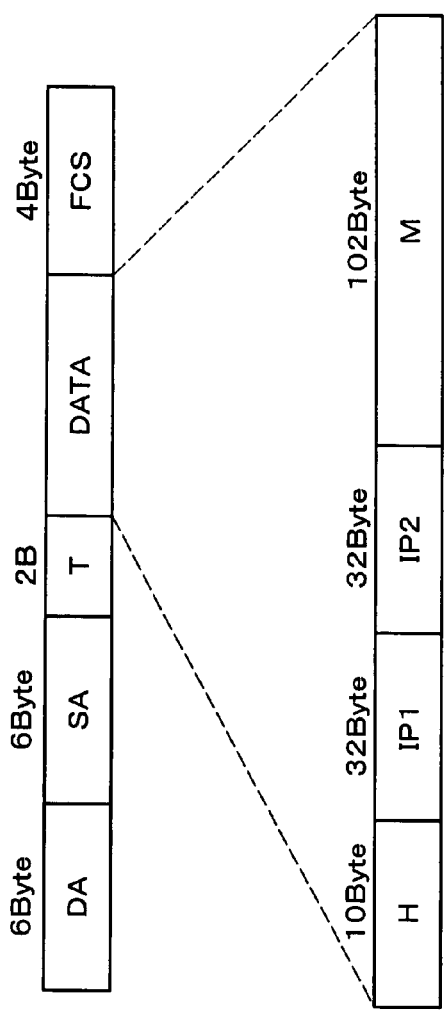
FIG. 13A is a figure showing a configuration of a IP packet corresponding to a fourth exemplary embodiment.
FIG. 13B shows information included in each part of a IP packet corresponding to a fourth exemplary embodiment.

FIG. 13A shows an exemplary configuration of an IP packet which the remote control apparatus 80 transmits to the server 121. FIG. 13B shows information included in each part of the IP packet.

The IP header generator 85 includes a function for adding an IP header to a wake up packet. According to control of the control unit 82, the control packet generator 86 generates a wake up packet shown in FIG. 1, and the IP header generator 85 stores the wake up packet in a data area of an IP packet as shown in FIG. 13A and FIG. 13B.

In an IP packet shown in FIG. 13A and FIG. 13B, when the remote control apparatus 80 transmits an IP packet, a DA (destination MAC address) includes a MAC address of the router 54. An SA (source MAC address) includes a MAC address of the remote control apparatus 80.

An IP1 (source IP address) includes an IP address of the remote control apparatus 80. An IP2 (destination IP address) includes an IP address of the router 91.

The router 54 and the router 100 transmit a wake up packet stored in an IP packet which is transmitted by the remote control apparatus 80 to the network 101 through a usual IP routing. Upon receipt of a wake up packet to which an IP header is added, the router 91 broadcasts the wake up packets into the network 101.

When a wake up packet reaches the server 121, a network interface of the server 121 confirms whether a MAC address described in the wake up packet is MAC address of the server 121. If both MAC addresses accord, the network interface turns on a power supply of the server 121.

In a configuration of the fourth exemplary embodiment, the remote control apparatus 80 transmits a wake up packet to a desired network using IP tunneling. For this reason, the fourth exemplary embodiment has an advantage that a router of a sub network on which a control target is installed does not need to have a function for generating a wake up packet unlike the first to third exemplary embodiments. Also, it has an advantage that a router of each existing sub network can be used without any modification.

Further, descriptions and drawings of the above mentioned exemplary embodiments show an example of a configuration and an operation of the present invention, and a scope of the present invention is not determined by these.

For example, the remote control system of the present invention can also be applied to operation status confirmation of an apparatus located in a remote area, a failure diagnosis of hardware and a control such as a setting change of a network interface other than a remote power-on control of an apparatus.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

While the invention has been described in connection with certain preferred exemplary embodiments, it is to be understood that the subject matter encompassed by way of the invention is not to be limited to those specific exemplary embodiments. On the contrary, it is intended for the subject matter of the invention to include all alternative, modification and equivalents as can be included within the spirit and scope of the following claims.

Further, it is the inventor's intention to retain all equivalents of the claimed invention even if the claims are amended during prosecution.

What is claimed is:

1. A remote control system which comprises a remote control apparatus on a network, a control packet transmitter which is on a sub network and is connected with said remote control apparatus via a network interconnecting apparatus, an operation terminal which can connect with said remote control apparatus, and a control target which is installed on a sub network on which said control packet transmitter is installed, wherein said operation terminal transmits information which indicates said control target, and a control content of said control target to said remote control apparatus, wherein said remote control apparatus includes:
a reception unit on a remote control apparatus side which receives said information which indicates said control target and said control content;
a device information table which includes an address of said control packet transmitter which manages said control target and an address of said control target both corresponding to the information which indicates said control target; and
a transmission unit on said remote control apparatus side which searches said device information table based on received information which indicates said control target, acquires said addresses, and transmits a control request packet including said control content and said acquired address which indicates said control target to said control packet transmitter, and wherein said control packet transmitter includes a transmission unit on said control packet transmitter side which receives said control request packet from said remote control apparatus and transmits a control packet including a control content designated by said control request packet to said control target.

2. The remote control system according to claim 1, wherein communication between said remote control apparatus and said control packet transmitter is performed using Hypertext Transfer Protocol (HTTP) tunneling.

3. The remote control system according to claim 2, wherein said control packet comprises a wake up packet, and
wherein said control packet transmitter is configured as a part of said network interconnecting apparatus.

4. The remote control system according to claim 1, wherein said network interconnecting apparatus comprises a router.

5. The remote control system according to claim 1, wherein
said remote control system further includes a firewall and an authentication server which includes a user authentication function,
said operation terminal can be connected to the Internet,
said firewall is placed between said Internet and said remote control apparatus,
said authentication server is connected to said firewall, and
said operation terminal connects with said authentication server via said firewall before connecting with said remote control apparatus.

6. The remote control system according to claim 1, wherein
said control packet transmitter includes a response unit on said control packet transmitter side which transmits a transmission result of a control packet to said remote control apparatus as a reply after transmitting said control packet, and
said remote control apparatus further includes a response unit on said remote control apparatus side which transmits a transmission result of said control packet to said operation terminal as a reply according to said transmission result transmitted from said response unit on said remote control apparatus side.

7. A remote control method of a system which comprises a remote control apparatus on a network, a control packet transmitter which is on a sub network and connects with said remote control apparatus via a network interconnecting apparatus, an operation terminal which can connect with said remote control apparatus and a control target installed on a sub network on which said control packet transmitter is installed, said method comprising:

transmitting information which indicates said control target and a control content of said control target to said remote control apparatus by said operation terminal;

receiving information which indicates said control target and said control content by said remote control apparatus;

searching said device information table including an address of said control packet transmitter which manages said control target and an address of said control target both corresponding to said information which indicates said control target based on said received information which indicates said control target, and acquiring an address of said control packet transmitter which manages said control target and an address of said control target;

transmitting a control request packet including said control content and said acquired address which indicates said control target to said control packet transmitter by said remote control apparatus; and receiving said control request packet from said remote control apparatus and transmitting a control packet including said control content designated by said control request packet to said control target by said control packet transmitter.

8. The remote control method according to claim 7, wherein communication between said remote control apparatus and said control packet transmitter is performed using Hypertext Transfer Protocol (HTTP) tunneling.

9. The remote control method according to claim 8, wherein said control packet comprises a wake up packet, and wherein said control packet transmitter is configured as a part of said network interconnecting apparatus.

10. The remote control method according to claim 7, wherein said network interconnecting apparatus comprises a router.

11. A remote control apparatus used for a system which comprises a remote control apparatus on a network, a control packet transmitter which is on a sub network and connects with said remote control apparatus via a network interconnecting apparatus, an operation terminal which can connect with said remote control apparatus and a control target installed on a sub network on which said control packet transmitter is installed, the apparatus comprising:

a reception unit on said remote control apparatus side which receives information which indicates said control target and said control content from said operation terminal;

a device information table including an address of said control packet transmitter which manages said control target and an address of said control target both corresponding to said information which indicates said control target; and a transmission unit on said remote control apparatus side which searches said device information table based on received information which indicates said control target, acquires said address of said control packet transmitter which manages said control target and said address of said control target, and transmits a control request packet including said control content and said acquired address which indicates said control target to said control packet transmitter.

12. The remote control apparatus according to claim 11, wherein communication between said remote control apparatus and said control packet transmitter is performed using Hypertext Transfer Protocol (HTTP) tunneling.

13. A control method of a remote control apparatus used for a system which comprises a remote control apparatus on a network, a control packet transmitter which is on a sub network and connects with said remote control apparatus via a network interconnecting apparatus, an operation terminal which can connect with said remote control apparatus, and a control target installed on a sub network on which said control packet transmitter is installed, said method comprising:

storing a device information table including an address of said control packet transmitter which manages said control target and an address of said control target both corresponding to said information which indicates said control target in advance;

receiving information which indicates said control target and said control content from said operation terminal and searching said device information table based on received information which indicates said control target;

acquiring said address of said control packet transmitter which manages said control target and said address of said control target; and transmitting a control request packet including said control content and said acquired address which indicates said control target to said control packet transmitter.

14. The control method of a remote control apparatus according to claim 13, wherein communication between said remote control apparatus and said control packet transmitter is performed using Hypertext Transfer Protocol (HTTP) tunneling.

15. A computer readable recording medium in which a program is embodied for a remote control apparatus used for a system which comprises a remote control apparatus on a network, a control packet transmitter which is on a sub network and connects with said remote control apparatus via a network interconnecting apparatus, an operation terminal which can connect with said remote control apparatus, and a control target installed on a sub network on which said control packet transmitter is installed, said program comprising:

interpreting information which indicates said control target and said control content;

searching a device information table including an address of said control packet transmitter which manages said control target and an address of said control target both corresponding to said information which indicates said control target based on received information which indicates said control target;

acquiring said address of said control packet transmitter which manages said control target and said address of said control target; and transmitting a control request packet including said control content and said acquired address which indicates said control target to said control packet transmitter.

16. The computer readable recording medium according to claim 15, wherein communication between said remote control apparatus and said control packet transmitter is performed using Hypertext Transfer Protocol (HTTP) tunneling.

17. A remote control system which comprises a remote control apparatus on a network, a network interconnecting apparatus which is on a sub network and connects with said remote control apparatus, an operation terminal which can connect with said remote control apparatus, and a control target installed on a sub network on which said network interconnecting apparatus is installed, wherein said operation terminal comprises a transmission unit on said operation terminal side which transmits information which indicates said control target and a control content of said control target to said remote control apparatus, and wherein said remote control apparatus includes:

a device information table including an address of said network interconnecting apparatus which manages said control target and an address of said control target both corresponding to said information which indicates said control target;

a reception unit on said remote control apparatus side which receives said information which indicates said control target and said control content; and a transmission unit on said remote control apparatus side which searches said device information table based on received information which indicates said control target, acquires said address of a network interconnecting apparatus which manages said control target and an address of said control target, and transmits a control packet including said control content and said address of said control target to said network interconnecting apparatus using Internet Protocol (IP) tunneling.

18. The remote control system according to claim 17, wherein said control packet comprises a wake up packet.

19. The remote control system according to claim 17, wherein said network interconnecting apparatus comprises a router.

20. The remote control system according to claim 17, wherein
said remote control system further includes a firewall and an authentication server which includes a user authentication function,
said operation terminal can connect to the Internet,
said firewall is placed between said Internet and said remote control apparatus,
said authentication server is connected to said firewall, and
said operation terminal connects with said authentication server via said firewall before connecting with said remote control apparatus.

21. The remote control system according to claim 17, wherein said remote control apparatus further includes a response unit of said remote control apparatus side which transmits a transmission result of said control packet to said operation terminal as a reply.

22. A remote control method of a system which comprises a remote control apparatus on a network, a network interconnecting apparatus which is on a sub network and connects with said remote control apparatus, an operation terminal which can connect with said remote control apparatus, and a control target installed on a sub network on which said network interconnecting apparatus is installed, said method comprising:
transmitting information which indicates said control target and a control content of said control target to said remote control apparatus by said operation terminal;
receiving information which indicates said control target and said control content by said remote control apparatus;
searching said device information table including an address of said network interconnecting apparatus which manages said control target and an address of said control target both corresponding to said information which indicates said control target based on said received information which indicates said control target, and acquiring an address of said network interconnecting apparatus which manages said control target and an address of said control target;
transmitting a control request packet including said control content and said acquired address which indicates said control target to said network interconnecting apparatus by said remote control apparatus using Internet Protocol (IP) tunneling; and
receiving said control request packet from said remote control apparatus and transmitting a control packet including said control content designated by said control request packet to said control target by said network interconnecting apparatus.

23. The remote control method according to claim 22, wherein said control packet comprises a wake up packet.

24. A remote control apparatus used for a system which comprises a remote control apparatus on a network, a network interconnecting apparatus which is on a sub network and connects with said remote control apparatus, an operation terminal which can connect with said remote control apparatus, and a control target installed on a sub network on which said network interconnecting apparatus is installed, the apparatus comprising:
a reception unit on said remote control apparatus side which receives information which indicates said control target and said control content from said operation terminal;
a device information table including an address of said control packet transmitter which manages said control target and an address of said control target both corresponding to said information which indicates said control target; and
a transmission unit on said remote control apparatus side which searches said device information table based on received information which indicates said control target, acquires an address of said network interconnecting apparatus which manages said control target and said address of said control target, and transmits a control packet including said control content and said address of said control target to said network interconnecting apparatus using Internet Protocol (IP) tunneling.

25. The remote control apparatus according to claim 24, wherein said control packet comprises a wake up packet.

26. A control method of a remote control apparatus of a system which comprises a remote control apparatus on a network, a network interconnecting apparatus which is on a sub network and connects with said remote control apparatus, an operation terminal which can connect with said remote control apparatus, and a control target installed on a sub network on which said network interconnecting apparatus is installed, said method comprising:
storing a device information table including an address of a control packet transmitter which manages said control target and an address of said control target both corresponding to said information which indicates said control target by said remote control apparatus in advance;
receiving said information which indicates said control target and said control content from said operation terminal by said remote control apparatus;
searching said device information table including an address of said network interconnecting apparatus which manages said control target and said address of said control target both corresponding to said information which indicates said control target based on received information which indicates said control target by said remote control apparatus;
acquiring said address of said network interconnecting apparatus which manages said control target and said address of said control target by said remote control apparatus; and
transmitting a control packet including said control content and said address of said control target to said network interconnecting apparatus using Internet Protocol (IP) tunneling.

27. The control method of a remote control apparatus according to claim 26, wherein said control packet comprises a wake up packet.

28. A computer readable recording medium in which a program is embodied for a remote control apparatus used for a system which comprises a remote control apparatus on a network, a network interconnecting apparatus which is on a sub network and connects with said remote control apparatus, an operation terminal which can connect with said remote control apparatus, and a control target installed on a sub network on which said network interconnecting apparatus is installed, said program, comprising:

receiving information which indicates said control target and said control content;

searching said device information table including an address of said network interconnecting apparatus which manages said control target and an address of said control target both corresponding to said information which indicates said control target based on received information which indicates said control target;

acquiring said address of said network interconnecting apparatus which manages said control target and said control target; and transmitting a control packet including said control content and said address of said control target to said network interconnecting apparatus using Internet Protocol (IP) tunneling.

29. The computer readable recording medium according to claim 28, wherein said control packet comprises a wake up packet.

* * * * *